United States Patent [19]

Frazier et al.

[11] Patent Number: 5,101,591
[45] Date of Patent: Apr. 7, 1992

[54] ICE FISHING ALARM

[76] Inventors: William R. Frazier, 8810 Capac Rd.; Jimmy F. Stephens, 2895 Bullock Rd., both of, Brown City, Mich. 48416

[21] Appl. No.: 578,677
[22] Filed: Sep. 7, 1990
[51] Int. Cl.⁵ .............................. A01K 93/00
[52] U.S. Cl. ........................................ 43/17
[58] Field of Search ................ 43/17, 4, 15, 16

[56] References Cited

U.S. PATENT DOCUMENTS

| | | | |
|---|---|---|---|
| 2,575,156 | 11/1951 | Baugh | 43/17 |
| 2,741,054 | 4/1956 | Brundage | 43/17 |
| 2,785,493 | 3/1957 | Thiel | 43/17 |
| 4,253,262 | 3/1981 | Johnson | 43/17 |
| 4,285,154 | 8/1981 | Grahl | 43/17 |
| 4,928,419 | 5/1990 | Forrestal | 43/17 |

Primary Examiner—Richard K. Seidel
Assistant Examiner—James Miner
Attorney, Agent, or Firm—Leon Gilden

[57] ABSTRACT

A mounting plate is arranged to overlie an ice fishing opening within an ice plate wherein the mounting plate includes a downwardly extending support cylinder with the cylinder rotatably mounting a spool at its lower end with the spool coaxially aligned with the support cylinder. The cylinder includes an L-shaped guide hook to guide fishing line from the spool and mounts an axially displaced rotatable leg member in a parallel relationship, wherein the leg member includes a projection that cooperates with a further L-shaped member affixed to the spool whereupon rotation of the spool effects rotation of the leg member and the leg member includes a release leg at an upper terminal end thereof whereupon rotation of the release leg effects release of an indicator flag. The apparatus further includes a transparent bubble member to contain heat within the organization to maintain the ice plate opening in a free orientation relative to the apparatus.

5 Claims, 4 Drawing Sheets

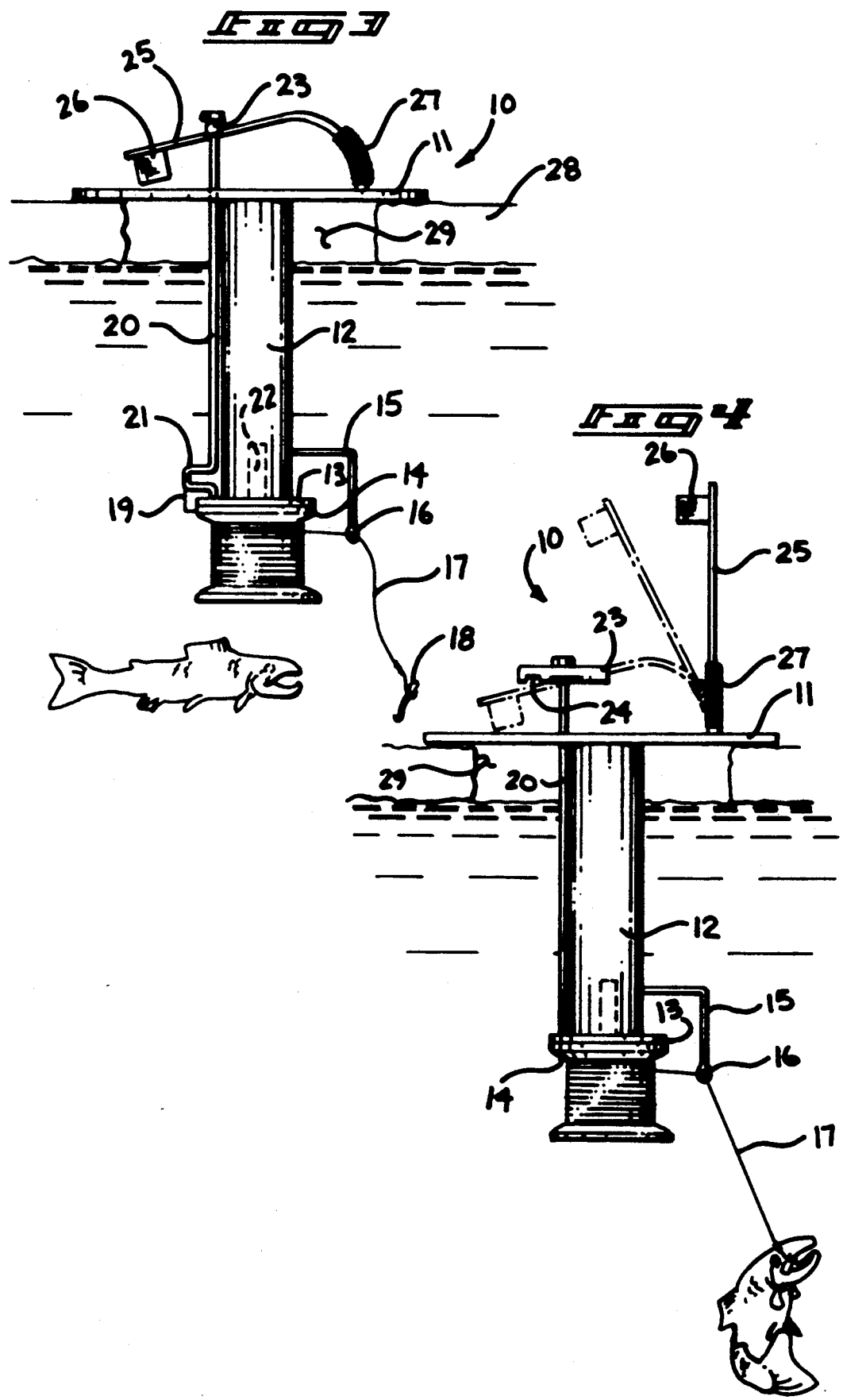

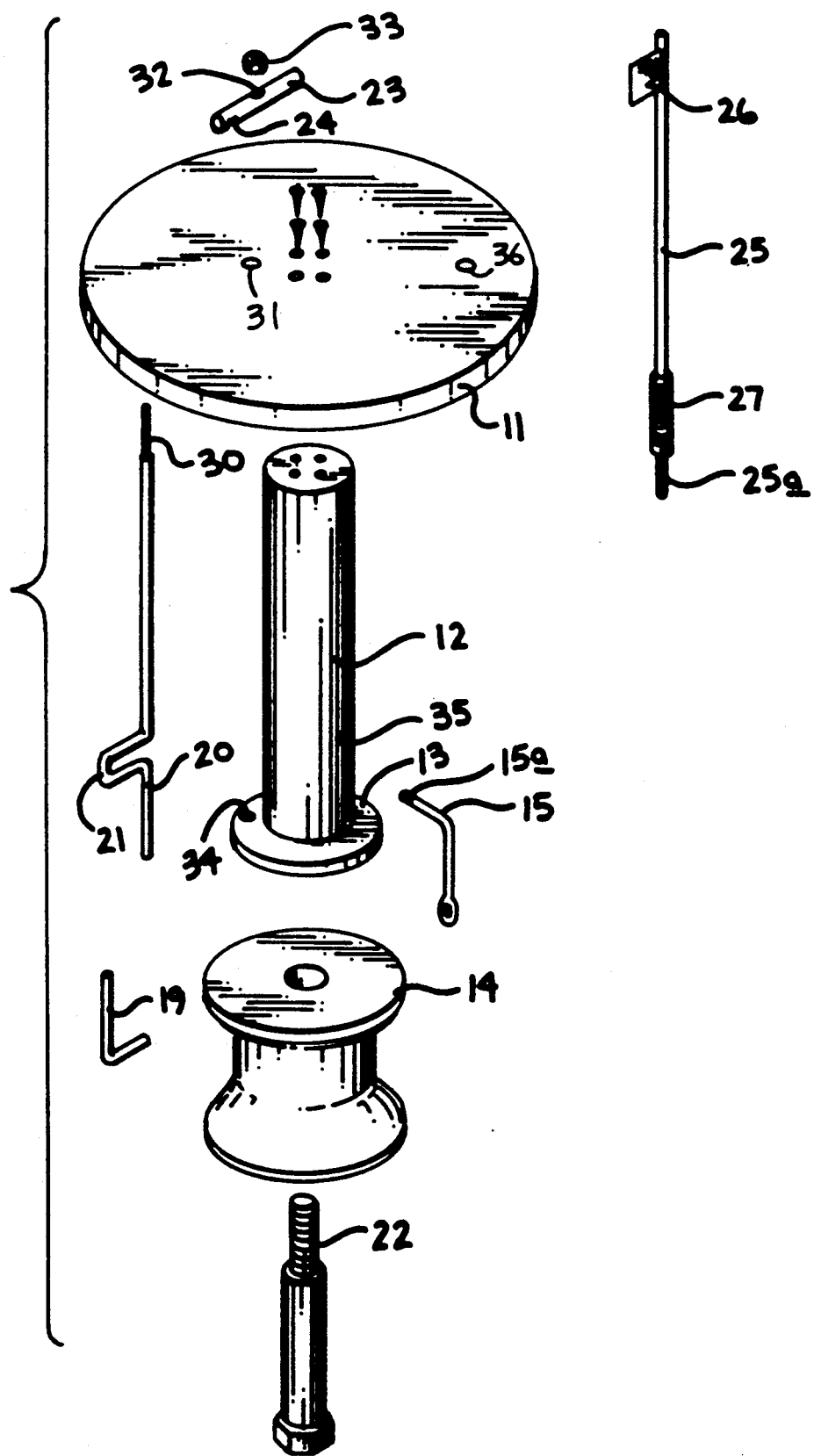

ICE FISHING ALARM

BACKGROUND OF THE INVENTION

1. Field of the Invention

The field of the invention relates to ice fishing alarm structure, and more particularly pertains to a new and improved ice fishing apparatus wherein the same utilizes tip up alarm in association with a rotatable spool member mounted at a lower terminal end of a support organization positioned within the water underlying an ice plate.

2. Description of the Prior Art

Ice fishing alarms of various types have been utilized in the prior art. Heretofore however the prior art structure has been of a relatively complex or elaborate configuration discouraging their use and development. The instant invention attempts to overcome deficiencies of the prior art by providing an effective and efficient organization further providing structure to contain solar heat within the organization and maintain its continued use. Examples of the prior art include U.S. Pat. No. 4,270,297 to YATES setting forth a prior art tip off alarm in association with a visual signal lamp actuated when the fishing line is directed through an underlying tube within the structure.

U.S. Pat. No. Des. 196,888 to PILSNER illustrates a tip off alarm organization encapsulated within a bubble like member.

U.S. Pat. No. 4,273,287 to GRAHL sets forth a further example of a ice fishing tip off alarm defining a platform overlying an ice fish hole opening.

U.S. Pat. No. 4,780,979 to Dyck et al sets forth a further example of an ice fishing alarm to effect release of a flag upon a fish strike mounted upon a plate member that is positioned within an opening of an ice plate.

U.S. Pat. No. 4,662,099 to STEWART sets forth a further example of an ice fishing alarm with the fishing line directed downwardly from apparatus positioned above an opening in the ice to effect fishing therethrough.

As such, it may be appreciated that there continues to be a need for a new and improved ice fishing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of ice fishing apparatus present in the prior art, the present invention provides a new and improved ice fishing apparatus wherein the same utilizes a coaxially aligned fishing spool and support structure mounted upon a support plate. As such, the general purpose of the present invention, which will be described subsequently in greater detail, is to provide a new and improved ice fishing apparatus which has all the advantages of the prior art ice fishing apparatus and none of the disadvantages.

To attain this, the ice fishing apparatus of the invention includes a mounting plate is arranged to overlie an ice fishing opening within an ice plate wherein the mounting plate includes a downwardly extending support cylinder with the cylinder rotatably mounting a spool at its lower end coaxially aligned with the support cylinder. The cylinder includes an L-shaped guide hook to guide fishing line from the spool and mounts an axially displaced in a parallel relationship, a rotatable leg member wherein the leg member includes a projection that cooperates with a further L-shaped member affixed to the spool whereupon rotation of the spool effects rotation of the leg member and the leg member includes a release leg at an upper terminal end thereof whereupon rotation of the release leg effects release of an indicator flag. The apparatus further includes a transparent bubble member to contain heat within the organization to maintain the ice plate opening in a free orientation relative to the apparatus.

There has thus been outlined, rather broadly, the more important features of the invention in order that the detailed description thereof that follows may be better understood, and in order that the present contribution to the art may be better appreciated.

There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ice fishing apparatus which has all the advantages of the prior art ice fishing apparatus and none of the disadvantages.

It is another object of the present invention to provide a new and improved ice fishing apparatus which may be easily and efficiently manufactured and marketed.

It is a further object of the present invention to provide a new and improved ice fishing apparatus which is of a durable and reliable construction.

An even further object of the present invention is to provide a new and improved ice fishing apparatus which is susceptible of a low cost of manufacture with regard to both materials and labor, and which accordingly is then susceptible of low prices of sale to the consuming public, thereby making such ice fishing apparatus economically available to the buying public.

Still yet another object of the present invention is to provide a new and improved ice fishing apparatus which provides in the apparatuses and methods of the prior art some of the advantages thereof, while simultaneously overcoming some of the disadvantages normally associated therewith.

Still another object of the present invention is to provide a new and improved ice fishing apparatus which may be compactly stored when not being utilized.

Yet another object of the present invention is to provide a new and improved ice fishing apparatus which includes a solar dome member to retain solar heat to maintain continuous operation of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein

FIG. 3 is an orthographic side view taken in elevation of the instant invention in a first position.

FIG. 4 is an orthographic side view taken in elevation of the instant invention in a second indicator position.

FIG. 5 is an isometric exploded illustration of the instant invention and its various components.

DESCRIPTION OF THE PREFERRED EMBODIMENT

Figure 1:
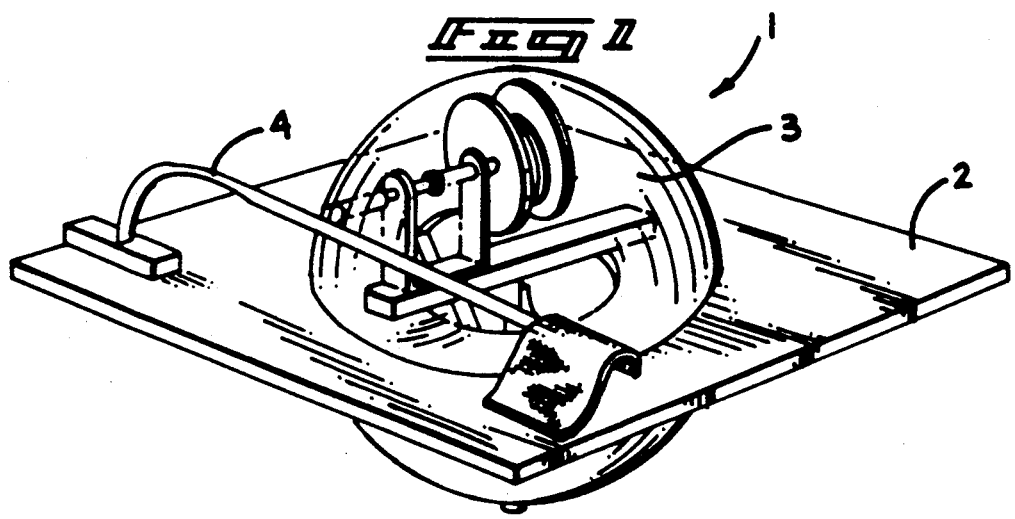
FIG. 1 is an isometric illustration of a prior art ice fishing alarm organization.

With reference now to the drawings, and in particular to FIGS. 1 to 6 thereof, a new and improved ice fishing apparatus embodying the principles and concepts of the present invention and generally designated by the reference numeral 10 will be described.

Figure 2:
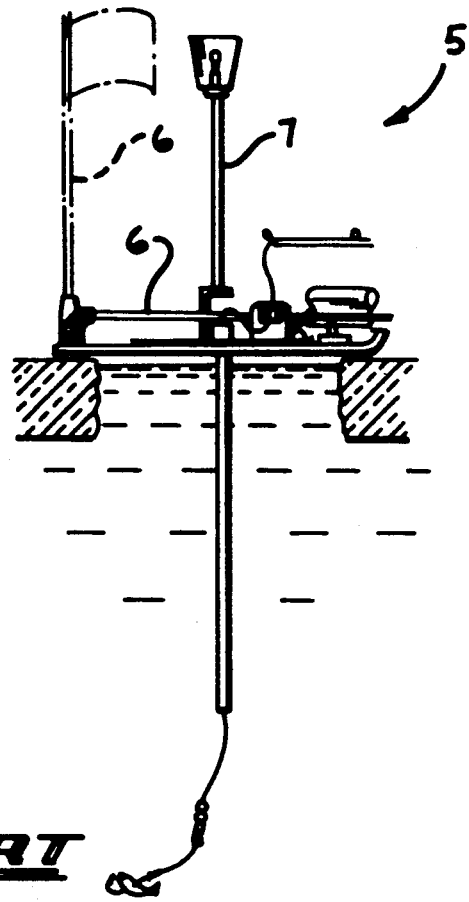
FIG. 2 is an orthographic side view of a further example of a prior art tip off alarm structure in an ice fishing apparatus.

FIG. 1 is a prior art ice fishing apparatus 1 utilizing a mounting plate 2 and a hollow spherical member 3 to enclose apparatus cooperating with alarm signal flag 4. FIG. 2 illustrates a further prior art alarm structure 5 wherein a signal flag 6 cooperates with a visual indicator 7 that is actuated upon fishing line being directed through a support tube above the apparatus in a manner as set forth in U.S. Pat. No. 4,270,297. The structure of FIG. 1 is set forth and depicted in U.S. Pat. No. Des. 196,888.

More specifically, the ice fishing apparatus 10 of the instant invention essentially comprises a transparent mounting plate including a support cylinder 12 medially and orthogonally mounted to a bottom surface of the transparent mounting plate 11. A support cylinder disc 13 is coaxially and fixedly mounted to a lower terminal end of the support cylinder 12 as illustrated in FIG. 3 for example. A spool 14 with a spool support axle 22 coaxially directed through the spool and into the support cylinder 12 rotatably mounts the spool 14 underlying the support cylinder disc 13. As illustrated, the spool 14 and support cylinder 12 are coaxially aligned. An L-shaped guide leg 15 is mounted orthogonally relative to the axis defined by the support cylinder 12 and includes a vertical guide leg with a guide leg eye 16 formed at a free end of the L-shaped guide leg spaced from the support cylinder 12 with the eye 16 positioned overlying the spool 14. As illustrated in FIG. 5, a horizontal leg of the L-shaped guide leg 15 includes a guide leg threaded end 15a threadedly received within a support cylinder threaded bore 35. It is understood, fishing line 17 wound about the spool 14 is directed through the eye 16 and includes a fishing lure 18 secured at a free terminal end of the fishing line 17.

Figure 6:
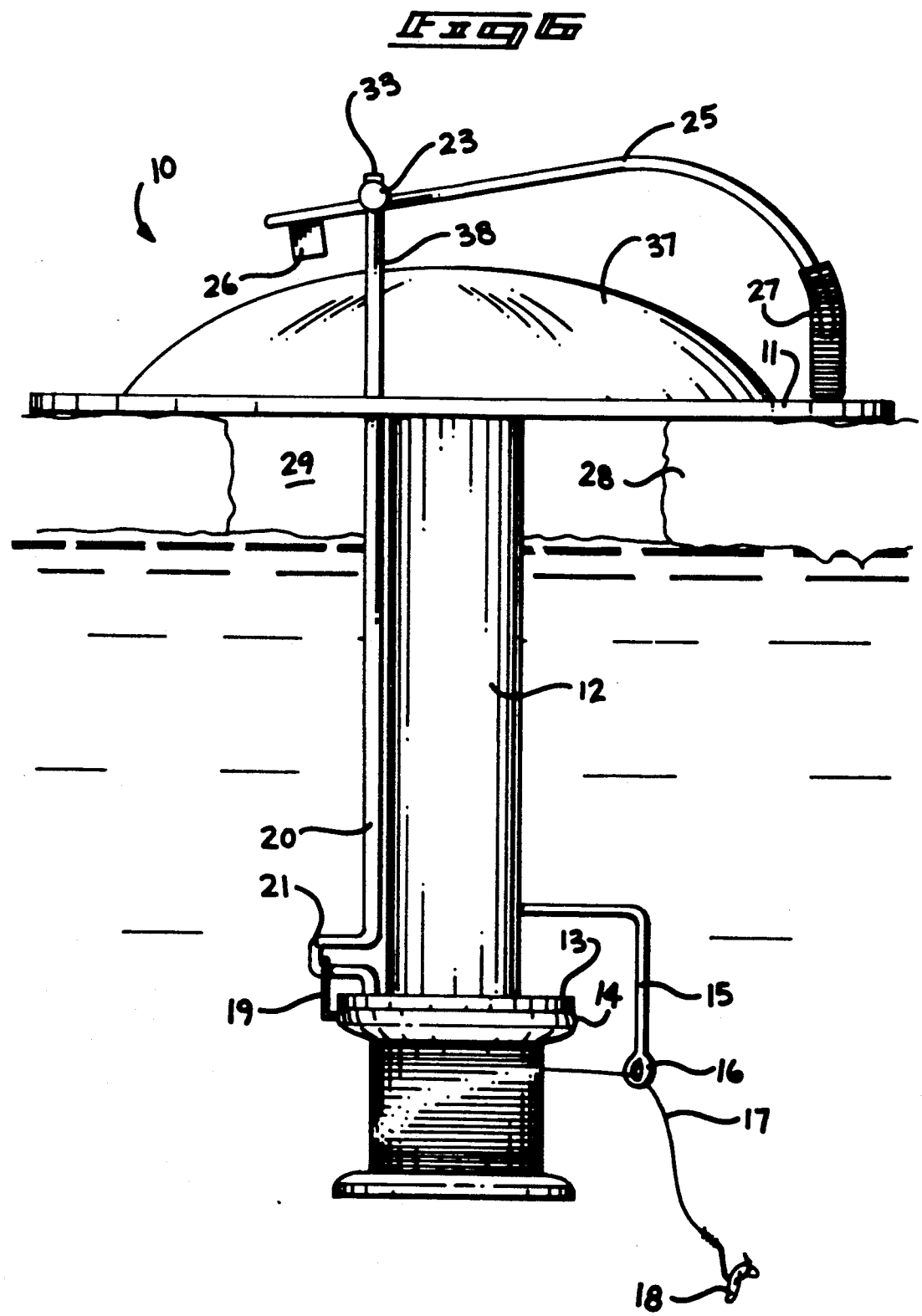
FIG. 6 is an orthographic side view of the instant invention illustrating the use of the solar dome incorporated by the instant invention.

An L-shaped actuator leg 19 mounted as illustrated to an upper flange of the spool 14 includes a horizontal leg secured to the spool flange and a vertical leg extending upwardly and parallel to the access of the support cylinder 12. The vertical leg of the L-shaped actuator leg 19 is radially spaced from the axis of the support cylinder 12 a predetermined spacing. An elongate leg member 20 is radially spaced from the axis of the support cylinder 12 a further spacing less than that defined by the predetermined spacing with the elongate leg member 20 rotatably mounted at its lower terminal end to the support cylinder disc 13 and received within a disc cavity 34 (see FIG. 5) to rotatably support the elongate leg member 20. The leg member 20 extends parallel to the support cylinder 12 and upwardly through a leg opening 31 formed through the transparent mounting plate (see FIG. 5). A leg member projection 21 is formed to the leg member 20 and is radially spaced from the axis of the support cylinder 12 a projection spacing equal to or greater than the predetermined spacing defined by the vertical leg of the L-shaped actuator leg 19 whereupon rotation of the spool 14 relative to the disc 13 effects contact of the projection 21 and rotation of the leg member 20. An upper terminal end of leg member 20 includes a leg threaded end 30 threadedly mounting a release leg 23 orthogonally arranged relative to the leg member 20. A threaded fastener 33 fixedly secures the release leg 23 with the threaded end 30 projecting through a release leg opening 32. A recess 24 formed at a bottom surface of the release leg 23 overlies an indicator leg 25 wherein the indicator leg 25 in a first position underlying the recess 24 encaptured therewithin. The indicator leg 25 includes a spring base 27 that is orthogonally arranged to a top surface of the mounting plate 11 in a second position when the indicator leg 25 is released by the release leg 23. The spring base 27 normally biases the indicator leg 25 in the second position and includes an indicator leg threaded end 25a coaxially aligned with the spring base 27 and the leg 25 to threadedly mount the indicator leg 25 within a mounting plate threaded opening 36. A signal member 26 mounted adjacent the upper terminal end of the indicator leg 25 enhances visual observation of the indicator leg 25 in the second position as illustrated in FIG. 4 release from the first position as illustrated in FIG. 3. The organization is mounted overlying an opening 29 within an isolator 28 to permit the fishing lure 18 to attract adjacent or surrounding fish relative to the organization. FIG. 6 illustrates the use of a solar transparent dome 37 that is positioned coaxially relative to the support cylinder 12 and includes a leg member opening 38 arranged parallel to the axis of the cylinder 12 and offset thereto to permit projection of the upper terminal end of the leg member 20 therethrough. The solar dome 37 while simultaneously permitting observation of the various components of the organization and their effective operation, further enhances the trapping of heat within the opening 29 to maintain its remaining opening and permitting effective operation and rotation of the elongate leg member 20. Further, it is also understood that the vertical leg of the actuator leg 19 extends above the support cylinder disc 13 a first spacing substantially equal to and greater than a second spacing defined by the positioning of the projection 21 above the support cylinder disc 13 to permit contact on the projection 21 by the vertical leg of the L-shaped actuator leg 19.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing apparatus comprising, a mounting plate, the mounting plate including a support cylinder integrally and orthogonally mounted to a bottom surface of the mounting plate, and the support cylinder defined by a support cylinder axis, and the support cylinder including a spool rotatable about a spool axis wherein the spool axis is coaxially aligned with the support cylinder axis, and a guide leg mounted to the support cylinder with the guide leg including a guide leg eye overlying the spool to accommodate fishing line from the spool directed through the eye, and an actuator leg mounted to the spool, and an elongate leg member rotatably mounted relative to the spool wherein the leg member includes a leg member projection, the leg member projection positioned adjacent the spool to accommodate impact by the actuator leg to effect rotation of the leg member projection and the leg member, and the leg member including a release leg fixedly mounted to an upper terminal end of the leg member position above an upper surface of the mounting plate, and the release leg rotatable from a first position to a second position, and an indicator leg wherein the indicator leg includes biasing means fixedly mounted to a lower terminal end of the indicator leg to bias the indicator leg from the first position wherein the indicator leg is positioned underlying the release leg to a second position wherein the indicator leg is in a vertical position when the release leg is rotated relative to the indicator leg, and wherein the guide leg is an "L" shaped configuration and includes a horizontal guide leg portion and a vertical guide leg portion the horizontal guide leg portion radially integrally mounted to the support cylinder orthogonally relative to the support cylinder axis with the vertical guide leg portion extending downwardly relative to the support cylinder to overlie the spool with the guide leg eye mounted to a lower terminal end of the vertical guide leg portion, and wherein the actuator leg is of a generally "L" shaped configuration and includes a horizontal actuator leg portion and a vertical actuator leg portion, and the spool includes a spool flange rotatably mounted relative to the support cylinder, and the horizontal actuator leg portion integrally mounted to the spool, and the vertical actuator leg portion extending upwardly relative to the support cylinder, and the support cylinder includes a support cylinder disc integrally and coaxially mounted to a lower terminal end of the support cylinder between the support cylinder and the spool, and the elongate leg member rotatably mounted to the support cylinder disc, and the projection extending above the support cylinder disc a first spacing, and the vertical actuator leg portion extending above the support cylinder disc a second spacing equal to or greater than the first spacing.

2. Apparatus as set forth in claim 1 wherein the vertical actuator leg portion is spaced from the support cylinder axis a predetermined spacing, and the leg member projection is spaced from the support cylinder axis a projection spacing greater than or equal to the predetermined spacing when the projection is in the first position extending radially outwardly relative to the support cylinder axis.

3. Apparatus as set forth in claim 2 wherein the release leg includes a release leg recess wherein the release leg recess is oriented to receive the indicator leg when the indicator leg is in the first position.

4. Apparatus as set forth in claim 3 including a solar transparent dome, and the mounting plate formed of a transparent material wherein the transparent dome and the mounting plate are arranged to receive and capture radiant heat to maintain an opening within an ice layer underlying the mounting plate.

5. Apparatus as set forth in claim 4 wherein the transparent dome includes a leg member opening to rotatably receive the leg member therethrough with the upper terminal end of the leg member and release leg positioned above the solar transparent dome.

* * * * *